United States Patent
Shon et al.

(10) Patent No.: US 8,036,146 B2
(45) Date of Patent: Oct. 11, 2011

(54) BCAST SERVICE SYSTEM AND CONTENTS TRANSMISSION METHOD USING THE SAME

(75) Inventors: Min-Jung Shon, Seoul (KR); Sung-Mu Son, Gyeonggi-Do (KR); Dong-Hee Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 1455 days.

(21) Appl. No.: 11/502,479

(22) Filed: Aug. 11, 2006

(65) Prior Publication Data
US 2007/0124784 A1 May 31, 2007

(30) Foreign Application Priority Data

Aug. 12, 2005 (KR) .................. 10-2005-0074447

(51) Int. Cl.
*H04L 12/56* (2006.01)
*H04W 4/00* (2009.01)
*H04N 1/173* (2006.01)
*G06F 15/16* (2006.01)

(52) U.S. Cl. ........ 370/282; 370/331; 370/389; 455/435; 709/201; 725/105

(58) Field of Classification Search .......... 370/232–236, 370/282–338, 390–401; 455/412–435; 709/224–231; 725/105–135
See application file for complete search history.

(56) References Cited

U.S. PATENT DOCUMENTS

| | | | | |
|---|---|---|---|---|
| 5,036,518 | A * | 7/1991 | Tseung | 714/748 |
| 6,445,679 | B1 | 9/2002 | Taniguchi et al. | |
| 6,983,410 | B2 * | 1/2006 | Chen et al. | 714/748 |
| 7,483,402 | B2 * | 1/2009 | Sturrock et al. | 370/282 |
| 2002/0083447 | A1 | 6/2002 | Heron et al. | |
| 2002/0111167 | A1 | 8/2002 | Nguyen et al. | |
| 2002/0154653 | A1 | 10/2002 | Benveniste | |
| 2003/0005382 | A1 | 1/2003 | Chen et al. | |
| 2004/0205338 | A1 * | 10/2004 | Bertin | 713/163 |
| 2004/0215698 | A1 * | 10/2004 | Bertin | 709/201 |
| 2005/0075107 | A1 * | 4/2005 | Wang et al. | 455/435.1 |
| 2005/0153650 | A1 * | 7/2005 | Hikomoto | 455/3.01 |
| 2006/0221882 | A1 * | 10/2006 | Jung et al. | 370/312 |
| 2006/0248090 | A1 * | 11/2006 | Bennett et al. | 707/10 |
| 2007/0110056 | A1 * | 5/2007 | Hwang et al. | 370/389 |

(Continued)

FOREIGN PATENT DOCUMENTS

CN 1250267 A 4/2000

(Continued)

OTHER PUBLICATIONS

"OMA A", Open Mobile Alliance, "Mobile Broadcast Service Architecture", May 5, 2005.*

(Continued)

*Primary Examiner* — M. Phan

(74) *Attorney, Agent, or Firm* — Birch, Stewart, Kolasch & Birch, LLP

(57) ABSTRACT

A broadcast/multicast (BCAST) service, specifically, a BCAST service system for transmitting broadcast contents to terminals when a network load is small and a contents transmission method using the same are disclosed. When contents are broadcast by using a distribution window (DM) and a presentation window (PW), the terminals feed back a message indicating reception confirmation of the contents to the network, such that the contents reception success rate between the terminals and the network can be improved.

25 Claims, 5 Drawing Sheets

U.S. PATENT DOCUMENTS

2007/0110057 A1* 5/2007 Hwang et al. .............. 370/389
2007/0115889 A1* 5/2007 Song et al. .................. 370/331
2008/0045185 A1* 2/2008 Lee et al. ................... 455/412.2

FOREIGN PATENT DOCUMENTS

| | | |
|---|---|---|
| CN | 1627725 A | 6/2005 |
| EP | 0959635 A1 | 11/1999 |
| JP | 2005-217743 A | 8/2005 |
| KR | 10-2003-0049110 B1 | 6/2003 |
| WO | WO 2005/036917 A1 | 4/2005 |
| WO | WO 2006/011063 A2 | 2/2006 |
| WO | WO 2006/110635 A1 | 10/2006 |

OTHER PUBLICATIONS

"OMA B", Open Mobile Alliance, "Service Guide for Mobile Broadcast Service" Oct. 26, 2005.*

Schulzrinne, H., Rao, A. and R. Ianphier, "Real Time Streaming Protocol (RTSP)", RFC 2326, Apr. 1998.*

Author Unknown "Mobile Broadcast Services Architecture" Open Mobile Alliance Ltd. 2005, OMA-AD-BCAST-V1_0-20050420-D, pp. 1-14.

Open Mobile Alliance Ltd., "Service Guide for Mobile Broadcast Services," Draft Version 1.0, Jul. 11, 2005, pp. 1-45, XP-002600648.

* cited by examiner

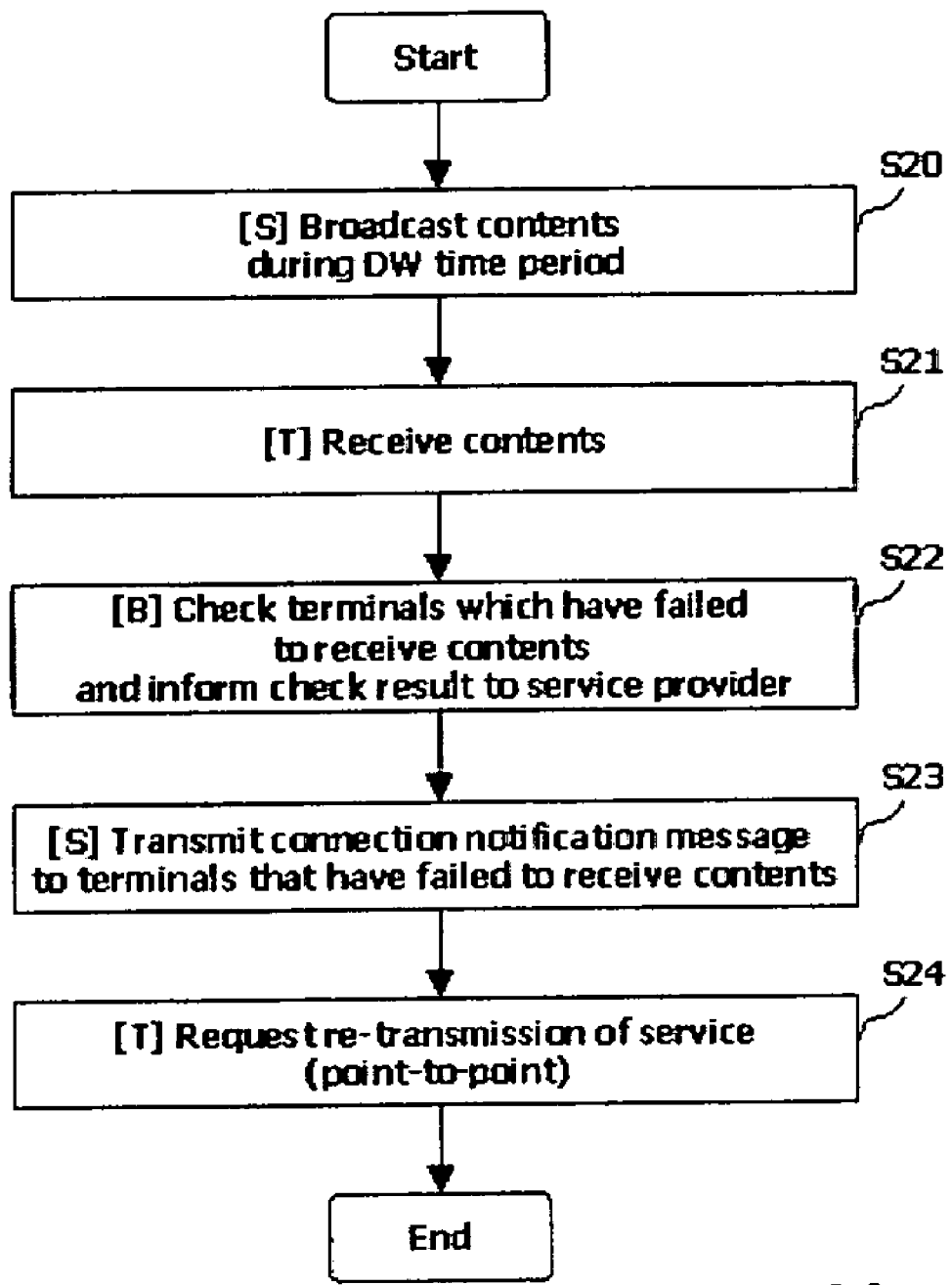

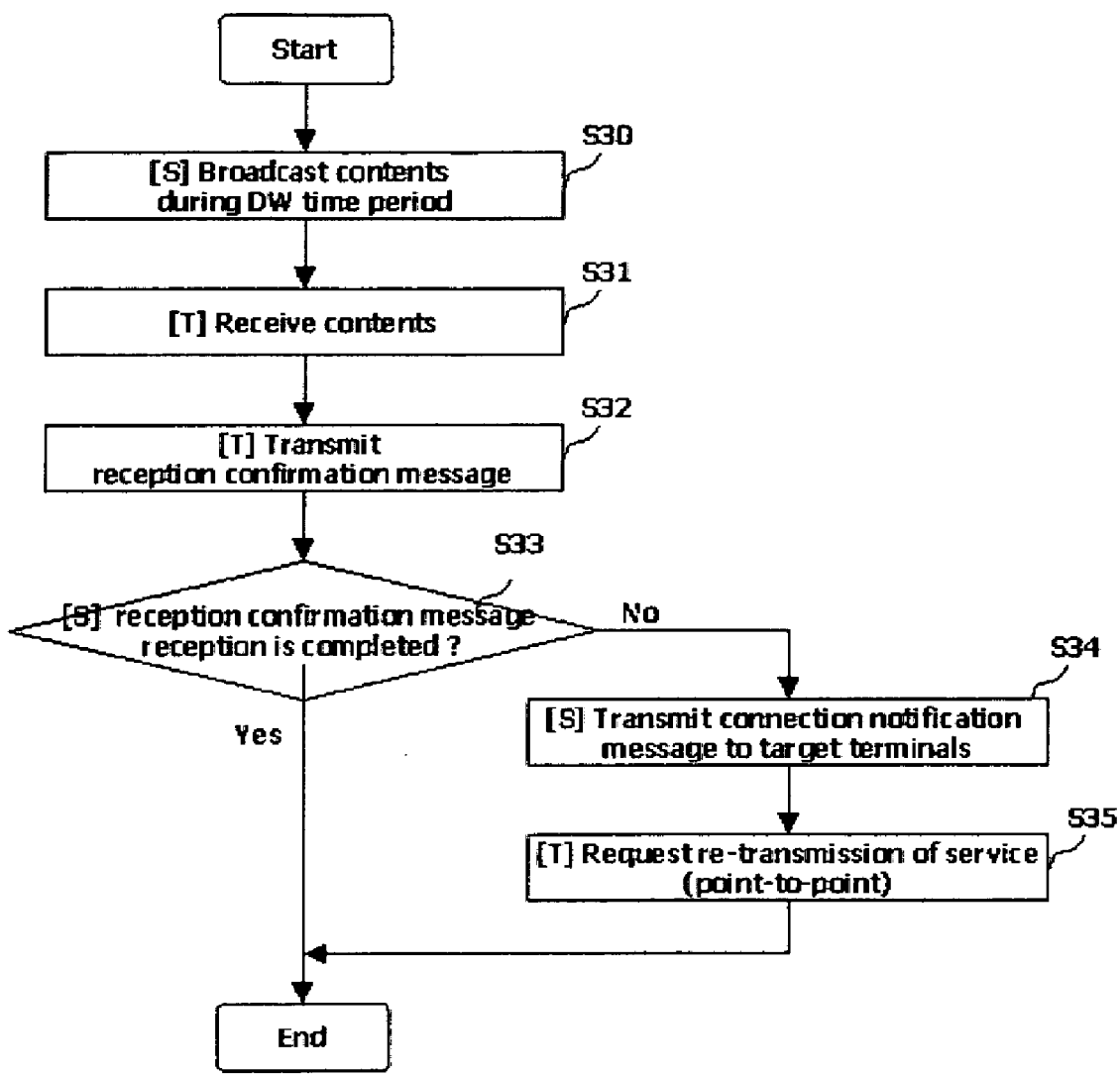

BCAST SERVICE SYSTEM AND CONTENTS TRANSMISSION METHOD USING THE SAME

BACKGROUND

1. Field of the Invention

The present invention relates to a broadcast/multicast service (referred to hereinafter as 'BCAST service') and, more particularly, to a BCAST service system for transmitting broadcast contents to terminals when a network load is small, and its contents transmission method.

2. Description of the Related Art

Broadcast services provided in a mobile communication system include a broadcast service that transmits contents of a program to terminals ahead of an actual broadcast time if the broadcast service is not a live broadcast.

When the broadcast service is in use, a network operator transmits contents when a network usage rate is low, whereby network resources can be effectively used, a user can seamlessly receive a service without delay, and a loss of battery power can be minimized. For example, the terminals can receive the contents in real time during a sleep mode, and when the transmission is completed, the terminals are changed to a long sleep mode to reduce unnecessary power consumption.

Accordingly, the broadcast service has advantages in that a contents of a program (e.g., a program guide) can be received before an actual broadcast time and the received contents can be received such that the user can know when an actual broadcast will be provided. An OMA BCAST defines this service concept as a distribution window (DW) and a presentation window (PW).

FIG. 1 shows the concept of the DW and PW.

With reference to FIG. 1, the DW is a unit of time during which contents of a certain program are transmitted to the terminals ahead of an actual broadcast time. The DW is divided into a distribution start time and a distribution end time. the PW is a unit of time for designating the contents received during the DW according to an actual broadcast time to allow the user to watch the contents. The PW is divided into a presentation start time and a presentation end time. Namely, the PW refers to a time interval during which the user can watch the program contents in an actual broadcast time, and the DW refers to a time interval during which the related contents are broadcast in advance to allow the user can to select and view the program contents during the PW.

In order to transmit the contents during the DW, a server attempts to connect with the terminals by turning a control signal on or off (e.g., sending or not sending a signal) to wake up the terminals so as to receive the contents. This involves an exchanging of contents between the network and the terminals, and the user can note the time periods of the DW and the PW by viewing a service guide provided to the user.

FIG. 2 shows an example of a service guide employing the DW and the PW.

With reference to FIG. 2, in the left schedule table, the Content ID indicates the title of a program to be aired during a particular time, and the Presentation Window (PW) indicates a time interval during which an actual program is played. The Distribution Window (DW) is established ahead of the PW, the actual broadcast time. As a result, by transmitting the contents of the program to the terminals during the DW ahead of time, the users may receive and watch the contents in an improved manner.

However, in the related art broadcast service using the DW and the PW, if s the terminal is located in an OFF state or located in a shadow area (i.e., a poor coverage area), if memory capacity of the terminal is not sufficient, and/or if battery capacity of the terminal is not sufficient, the terminal may fail to receive the contents during the DW. Also, the server cannot check whether all terminals have properly received the contents during the DW and the users cannot watch a normal program during the PW because of service delays or discontinuation.

SUMMARY OF THE INVENTION

One aspect of the present invention is the recognition by the present inventors about the problems in the related art described above. Based upon this recognition, the features of the present invention have been developed.

One exemplary feature of the present invention is to provide a BCAST service (broadcast) system capable of increasing a contents reception success rate of the terminals. This is achieved by allowing the terminals to transmit to the network a feedback message with respect to the downloading of contents, and a contents transmission method using the same.

To implement at least the above feature in whole or in parts, the present invention provides a BCAST service system that may include: a server for transmitting a contents of a certain program to a terminal during a first time period and determining re-transmission of the contents according to a reception report message of the terminal; and a terminal for feeding back the reception report message of the contents to the server.

Preferably, the contents is received during the first time period and played the contents during a second time period by the terminal. Here, the first time period indicates a Distribution Window (DW) time period and the second time period indicates a Presentation Window (PW) time period.

Preferably, the server transmits an identifier related to the first time period to the terminal.

Preferably, the reception report message includes an identifier related to the first time period.

Preferably, the server transmits to the terminal a service guide including the first time and a second time periods that are scheduled for each of the contents.

Preferably, the server determines a re-transmission of the contents according to a contents reception success rate calculated by using the reception report message.

Preferably, if the contents reception success rate is a certain value or greater, the server re-transmits the contents in a point-to-point manner, and if the contents reception success rate of the terminal is smaller than the certain value, the server re-transmits the contents in a point-to-multipoint manner.

To implement at least the above feature in whole or in parts, the present invention also provides a BCAST service system that may include: a server for transmitting a contents to one or more terminals during a first time period and transmitting a connection notification message to a terminal which has not transmitted a reception report message; and a terminal for requesting a re-transmission of the contents from the server by using information included in the connection notification message.

Preferably, the first time period indicates a DW duration and a second time period indicates a PW duration.

Preferably, the server transmits an identifier related to the first time period to the terminals.

Preferably, the connection notification message is an SMS message which includes information regarding an attempt/failure of the transmission of the contents during the first time period and a URL.

Preferably, the request for re-transmission of the contents is available only before the second time period, and individually made by each terminal.

The BCAST service system may further include a network element (entity) for checking whether or not any terminal unavailable for receiving the contents and informing the server about such terminals. The network entity is a BCAST distribution system that supports 1:M communications.

To implement at least the above feature in whole or in parts, the present invention also provides a contents transmission method of a BCAST service system that may include: transmitting, by a server, a contents to one or more terminals during a first time period; feeding back, by the terminals that have received the contents, a reception report message to the server; and determining, by the server, a re-transmission of the contents by using the fed back reception report message.

Preferably, the first time period indicates a distribution window (DW) duration, and the contents is played during a second time period indicating a presentation window (PW) duration.

Preferably, the server transmits an identifier related to the first time period to the terminals.

Preferably, the server determines the re-transmission of the contents according to a contents reception success rate calculated by using the reception report message.

Preferably, if the contents reception success rate of the terminals is a certain value or greater, the server re-transmits the contents in a point-to-point manner, and if the contents reception success rate is smaller than the certain value, the server re-transmits the contents in a point-to-multipoint manner.

To implement at least the above feature in whole or in parts, the present invention also provides a contents transmission method of a BCAST service system that may include: transmitting, by a server, a contents to one or more terminals through a network during a first time period; checking, by the network, whether any terminals are unavailable for receiving the contents and informing the server of such terminals; transmitting, by the server, a connection notification message to the terminals which are unavailable for receiving the contents; and requesting, by the terminals, a re-transmission of the contents from the server by using information included in the connection notification message.

Preferably, the first time period indicates a distribution window (DW) duration, and the contents is played during a second time period indicating a presentation window (PW) duration.

Preferably, the server transmits an identifier related to the first time period to the terminals.

Preferably, the connection notification message is an SMS message including information regarding an attempt/failure of the transmission of the contents during the first time period and a URL.

Preferably, the request for re-transmission of the contents is available only before a second time period, and individually made.

To implement at least the above feature in whole or in parts, the present invention also provides a contents transmission method of a BCAST service system that may include: transmitting, by a server, an identifier of each first time period to one or more terminals through a network during the first time period; receiving a reception report message from the terminals; classifying terminals which have not transmitted the reception checking message and transmitting a connection notification message thereto; and requesting, by the terminals, a re-transmission of the contents from the server by using information included in the connection notification message.

Preferably, he first time period indicates a distribution window (DW) duration and the contents is played during a second time period indicating a presentation window (PW) duration.

Preferably, the connection notification message is an SMS message including information regarding an attempt/failure of a transmission of the contents during the first time period and a URL.

Preferably, the request for re-transmission of the contents is available only before a second time period, and individually made by each terminal.

Additional features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 is a flow chart illustrating the processes of a contents transmission method in a BCAST service system according to a second exemplary embodiment of the present invention; and FIG. 6 is a flow chart illustrating the processes of a contents transmission method in a BCAST service system according to a third exemplary embodiment of the present invention.

DETAILED DESCRIPTION

The exemplary embodiments of the present invention will now be described.

Figure 1:
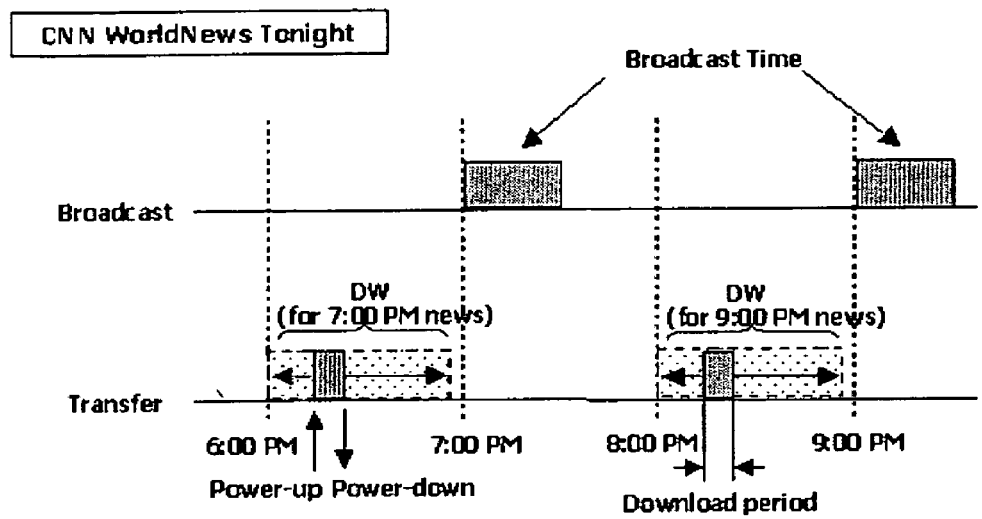
FIG. 1 is a view showing a distribution window (DW) and a presentation window (PW)
Figure 2:
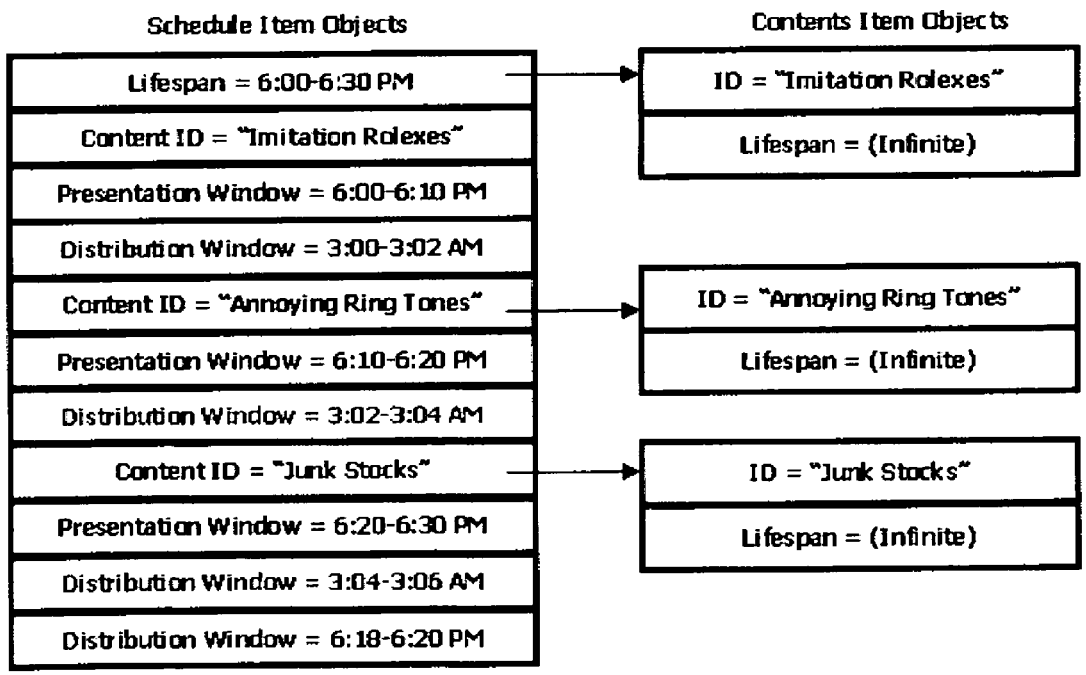
FIG. 2 shows an example of a service guide employing the DW and the PW.

A server may specify a DW (distribution window) and a PW (Presentation Window) for each of the contents in a schedule table of a service guide as shown in FIG. 2 through negotiation with a network operator, and transmits the contents to a terminal. Accordingly, the terminal downloads each of the contents during the DW time in a non-recognized manner (beyond recognition or without the knowledge of the user), and the user can actually watch the downloaded contents during the PW time.

However, in the related art, if the terminal is in an OFF state or in a shadow area (i.e., in a coverage area with no or poor service) so it cannot receive signals, or if a battery and/or memory capacity is not sufficient, the terminal may fail to receive the contents which have been transmitted by a network during the designated DW time period. This is because the related art server merely broadcast the contents in a point-to-multipoint manner, without checking as to whether the terminal has successfully received the corresponding contents.

To address this problem, the present invention provides a method for transmitting broadcast contents to increase a contents reception success rate of terminals during the DW time period. Specifically, in the present invention, the contents of a particular program are downloaded by using the DW and the PW, and the terminals feed back a reception report message of the contents to the network, to thereby increase the contents reception success rate between the terminals and the network. Preferably, each DW is discriminated by an identifier (DWid).

Figure 3:
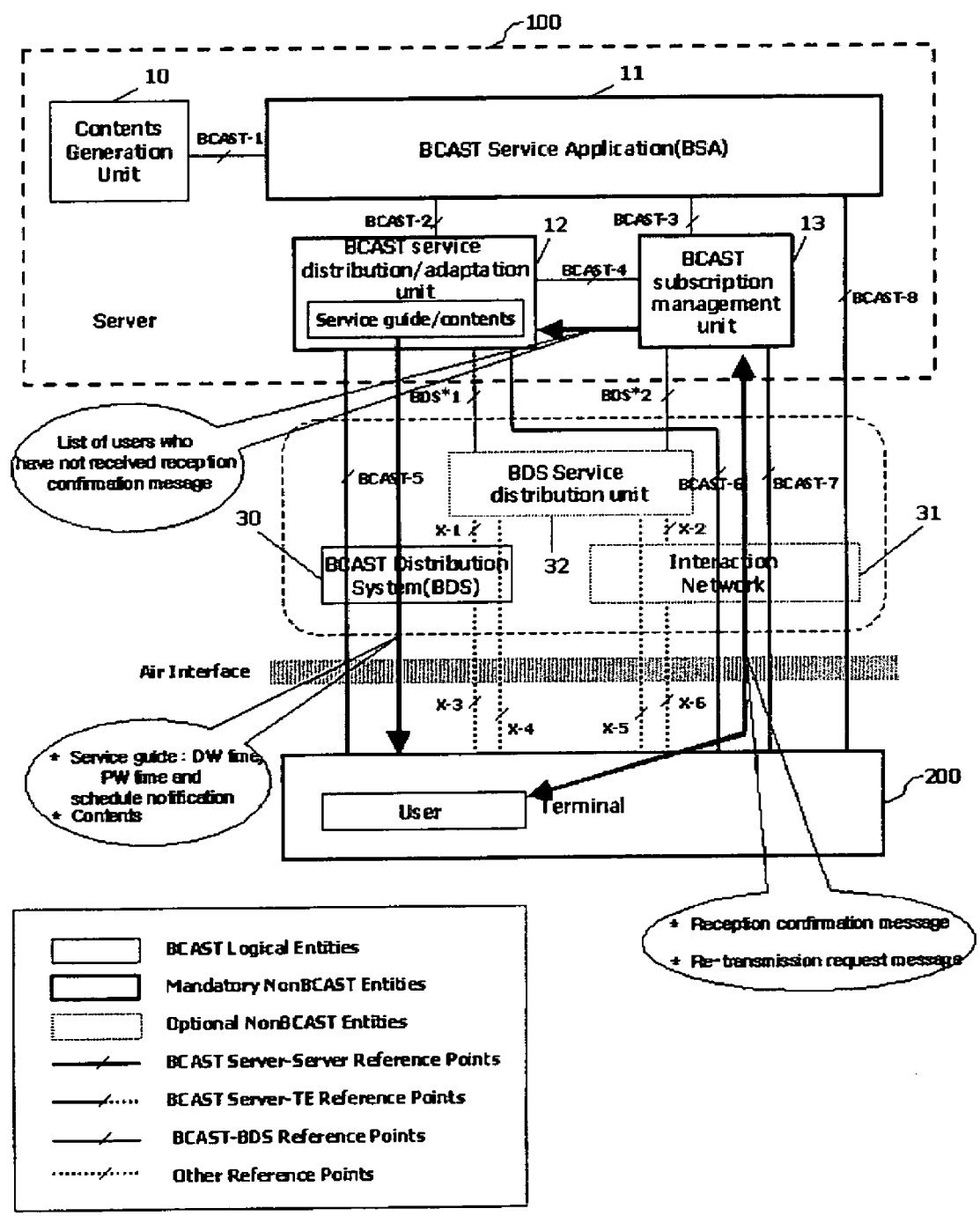
FIG. 3 is a view showing an exemplary structure of a BCAST (Broadcast) service system for implementing the present invention.

FIG. 3 is a view showing an exemplary structure of a BCAST (Broadcast) service system for implementing the present invention.

As shown in FIG. 3, the BCAST service system may include a server (or service provider) 100 for performing a function such as transmitting a contents and a service guide, protecting a contents, and maintaining and managing a BCAST service; and a terminal 200 for receiving broadcast, transmitted by the server 100, for the DW or the PW time.

In addition, the BCAST service system includes a BCAST distribution system (BDS) 30 for supporting 1:M communications to transmits the service guide and the contents to the terminal 200; an interaction network 31 for supporting 1:1 communications for bi-directional communications; and a BDS service distribution unit 32 for applying the BDS 30 or the interaction network 31 according to their respective bearers. The above elements may be applied to a non-broadcast network, namely, a wireless network or a mobile communication network that may be adapted to provide BCAST services.

The BDS 30 and the interaction network 31 may provide the necessary bearers to support the BCAST service such as a DVB-H (Digital Video Broadcasting-Handheld), an MBMS (Multimedia Broadcast Multicast Service), a BCMCS (Broadcast Mutlicast Service), an ISDB-T (Integrated Service Digital Broadcasting-Terrestrial), a T/S-DMB (Terrestrial/Satellite-Digital Multimedia Broadcasting), etc.

The server 100 may include a contents creation unit 10 for creating native contents; a BCAST service application (BSA) unit 11 for performing a function of processing and protecting the created contents or maintaining/managing the BCAST service; a BCAST service distribution/adaptation unit 12 for performing a function transferring a BCAST service, providing interfacing and a function of generating a service guide and contents scheduling by using particular bearers (to support DVB-H, MBMS, BCMCS, etc.); and a BCAST subscription management unit 13 for performing a function such as protecting and managing BCAST service/contents and maintaining and managing user subscription information. The BSA unit 11, the BCAST service distribution/adaptation unit 12 and the BCAST subscription management unit 13 transmit or exchange information and signals with each other through intercommunication functions.

The contents broadcasting method in the BCAST service system will be described in more detail.

In the present invention, the server refers to a party (entity) that manages subscribers who have subscribed to a broadcast service and maintains a dose relationship with the network and the terminal to successfully transmit contents.

Figure 4:
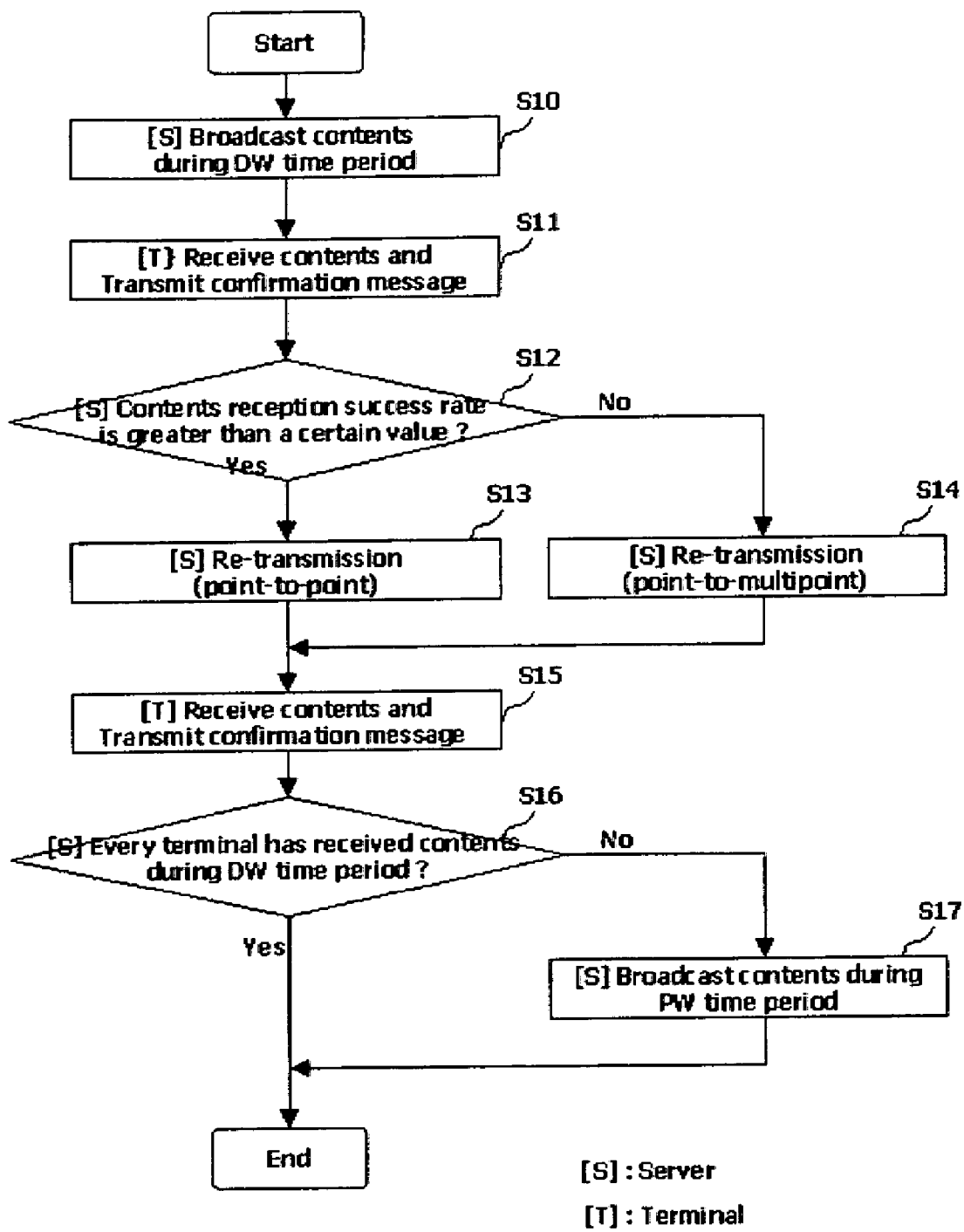
FIG. 4 is a flow chart illustrating the processes of a contents transmission method in a BCAST service system according to a first exemplary embodiment of the present invention.

FIG. 4 is a flow chart illustrating the processes of a contents transmission method in a BCAST service system according to a first exemplary embodiment of the present invention.

With reference to FIG. 4, the server wakes up the terminal 200 that are in an idle mode through the BCAST distribution system (BDS) 30 and transmits a contents to the terminal 200 through a broadcast channel during the DW time period (step S10). The server 100 may also transmit an identifier (DWid) related to each DW and the DWid may be defined in an XML syntax as follows:

<xs: attribute name="DWid" type="xs:inter" use="optional"/>

Namely, the BCAST service application unit 11 processes the native contents, which have been created by the contents creation unit 10, into a form suitable for BCAST and transfers such to the BCAST service distribution/adaptation unit 12. Then, the BCAST service distribution/adaptation unit 12 generates a service (program) guide by specifying the DW and the PW of each contents in the schedule table, and transmits the service guide to the terminal 200 with reference to subscriber information of the BCAST subscription management unit 13. Here, the terminal 200 refers to a terminal which can support the DW and the PW and is in a state of being available for reception.

Thereafter, the server 100, specifically, the BCAST service distribution/adaptation unit 12 transmits the contents to a plurality of terminals 200 during the DW time period, and upon successfully receiving the corresponding contents during each DW time period based on the DW identifier, the terminals 200 transmit a reception report message (or OK confirmation message) including a client ID, namely, a message indicating a reception completion of the contents, to the server 100 (step S11). In this case, the reception report message is transmitted to the BCAST subscription management unit 13 through the interaction network 31.

Upon receiving the reception report message from each terminal 200, the server 100 tallies up (calculates) a contents reception success rate based on the received confirmation messages, and checks whether the calculated reception success rate is a certain value or greater (step S12). Namely, when the confirmation message is received, the BCAST subscription management unit 13 transmits a list of terminals from which a confirmation message has not been received (namely, reception failed terminals) to the BCAST service distribution/adaptation unit 12, and the BCAST service distribution/adaptation unit 12 calculates the contents reception success rate based on the list and checks whether the reception success rate is high or low.

If the reception success rate is a certain value or greater, the BCAST service distribution/adaptation unit 12 re-transmits (e.g., by unicasting) the contents to the reception-failed terminals 200 in a point-to-point manner (step S13). If the reception success rate is smaller than the certain value, the BCAST service distribution/adaptation unit 12 re-transmits (e.g., by broadcasting) the contents to the reception-failed terminals 200 through a broadcast channel in a point-to-multipoint manner (step S14). As the contents are re-transmitted in a point-to-multipoint manner or point-to-point manner from the server 100, each of the terminals 200 receives them and transmits a confirmation message including a client ID to the server 100 (step S15).

Thereafter, the server 100 checks whether all the terminals 200 have successfully received the contents during the DW time period based on the confirmation messages (step S18). If all the terminals 200 have successfully received the contents during the DW time period, the server 100 completes transmission of the contents and the terminals 200 provide (play) the contents of the corresponding program for an actual broadcast time, namely, for the PW time period. Meanwhile, the terminals 200 (that can be discriminated by their client IDs) that have failed to receive the contents during the DW time period, receive the contents provided from the server 100 during the PW time period to thus play them to the user.

FIG. 5 is a flow chart illustrating the processes of a contents transmission method in a BCAST service system according to a second exemplary embodiment of the present invention.

First, the server 100 wakes up terminals 200 that are in an idle mode and broadcasts contents to the terminal 200 during the DW time period by using the BDS 30 (step S20). Accordingly, the terminals 200 receive the corresponding contents (step S21). In this process, the BDS 30 of the network to which the terminals 200 belong, checks a state of each terminal (namely, checks terminals which have not been available for receiving the contents (i.e., contents reception-failed terminals)), and informs the server 100 of these terminals (step S22).

Thereafter, when the terminals 200 are changed into a state that allows reception of the service (e.g., when the terminals are changed from an OFF state to an ON state, when the terminals moves out of a shadow area, when the battery power of the terminal is sufficient, etc.), the server 100 transmits an SMS message (e.g., a connection notification message) including information indicating that the contents transmission had been attempted but failed during the DW time period (i.e., failure information) and URL information to the terminals 200 (step S23).

Accordingly, the terminals 200 which have failed to receive the BCAST service during the DW time period can be changed to an available state for receiving the service (as they are re-connected with the network again), and if the user desires re-transmission of the corresponding contents, they can transmit a re-transmission request message to the BCAST subscription management unit 13 of the server 100 to request re-transmission of the service (step S24). Upon receiving the re-transmission request message, the BCAST subscription management unit 13 informs the BCAST service distribution/adaptation unit 12 about those terminals that request the re-transmission, so that the BCAST service distribution/adaptation unit 12 can re-transmit the contents again to the corresponding terminals. In this case, the re-transmission of the contents can be performed before the PW time period, but such re-transmission may not be possible if the terminals are re-connected during or after the PW time.

FIG. 6 is a flow chart illustrating the processes of a contents transmission method in a BCAST service system according to a third exemplary embodiment of the present invention.

With reference to FIG. 6, the server 100 broadcasts contents of a program to a plurality of terminals 200 during the DW time period (step S30). Upon receiving the contents, the terminals 200 transmit a reception report message (e.g., OK confirmation message) including a client ID to the BCAST subscription management unit 13 through the interaction channel (steps S31 and S32).

Thereafter, the server 100 receives a list of terminals 200 (that indicate those terminals from which the reception report message has not been received) from the BCAST subscription management unit 13. Namely, the server 100 checks whether the reception report message has been received from all the target terminals 200 (step S33). If the reception report message has been received from all the terminals 200, the server 100 completes the content transmission. If there are terminals from which the reception report message has not been received (i.e., reception failed terminals), the server 100 classifies the corresponding terminals 200 as re-transmission target terminals and then transmits a connection notification message including information on how many times the contents transmission had been made during the DW time period (i.e., failure information) and the URL to the re-transmission target terminals (step S34).

Accordingly, when the reception-failed terminals 200 become available for receiving the service (e.g., when the terminals are changed from the OFF state to the ON state, when the terminals move out of the shadow area, or when their battery power is sufficient, etc.), they can receive the connection notification message including the failure information and the URL.

Thereafter, when a user requests re-transmission of the contents with reference to content of the received connection notification message, each terminal 200 transmits a re-transmission request message to the BCAST subscription management unit 13 of the server 100 through the interaction channel to request re-transmission of the contents (step S35).

Then, the BCAST subscription management unit 13 provides a list of the re-transmission requesting terminals 200 to the BCAST service distribution/adaptation unit 12, and the BCAST service distribution/adaptation unit 12 re-transmits the contents to the corresponding terminals 200. In this case, the re-transmission of the contents may be performed before the PW time period, but such re-transmission may not be possible if the terminals are re-connected during or after the PW time period.

The second and third exemplary embodiments of the present invention can be effectively applied for situations where the contents are transmitted during the DW time period but the terminals fail to receive them because they are in a state of being unavailable for receiving the service (namely, terminals are in the OFF state or in the shadow area or when the battery of the terminals are not sufficient).

As so far described, the BCAST service system and its contents transmission method according to the present invention have the advantages that when program contents are downloaded by using the DW and PW, the terminal feeds back a reception report message to the network, which can be used to improve the contents reception success rate between the terminal and the network.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A broadcast/multicast (BCAST) service system for a broadcast service having certain contents, comprising:
    a server for transmitting a contents of a certain program to a terminal during a first time period and determining a re-transmission of the contents according to a reception report message of the terminal,
    wherein the server determines the re-transmission of the contents according to a contents reception success rate calculated by using the reception report message,
    wherein if the contents reception success rate is equal to or greater than a certain value, the server re-transmits the contents in a point-to-point manner, and if the contents reception success rate of the terminal is smaller than the certain value, the server re-transmits the contents in a point-to-multipoint manner, and
    wherein the reception report message of the contents is fedback to the server by the terminal.

2. The system of claim 1, wherein the contents is received during the first time period and played the contents during a second time period by the terminal.

3. The system of claim 2, wherein the first time period indicates a Distribution Window (DW) time period and the second time period indicates a Presentation Window (PW) time period.

4. The system of claim 1, wherein the server transmits an identifier related to the first time period to the terminal.

5. The system of claim 1, wherein the reception report message includes an identifier related to the first time period.

6. The system of claim 1, wherein the server transmits to the terminal a service guide including the first time period and one or more second time periods that are scheduled for each of the contents.

7. The system of claim 1, wherein the server comprises:
a contents creation unit for creating a native contents;
a BCAST service application unit for processing and protecting the created native contents or maintaining/managing a BCAST service;
a BCAST service distribution/adaptation unit for transmitting/re-transmitting the processed contents and generating/transmitting a service guide; and
a BCAST subscription management unit for maintaining/managing user subscription information and providing a list of terminals to the BCAST service distribution/adaptation unit to indicate which terminals have failed to receive the message.

8. A broadcast/multicast (BCAST) service system for a broadcast service having certain contents, comprising:
a server for transmitting a contents to one or more terminals during a first time period and transmitting a connection notification message to a terminal which has not transmitted a reception report message,
wherein the server comprises:
a contents creation unit for creating a native contents;
a BCAST service application unit for processing and protecting the created native contents or maintaining/managing a BCAST service;
a BCAST service distribution/adaptation unit for transmitting/re-transmitting the processed contents; and
a BCAST subscription management unit for maintaining/managing user subscription information and providing a list of terminals to the BCAST service distribution/adaptation unit that indicate which terminals have transmitted the reception report message and the re-transmission request message; and
wherein a re-transmission of the contents from the server is requested by the terminal using information included in the connection notification message.

9. The system of claim 8, wherein the first time period indicates a distribution window (DW) duration and the contents is played during a second time period indicating a presentation window (PW) duration.

10. The system of claim 8, wherein the server transmits an identifier related to the first time period to the terminal.

11. The system of claim 8, wherein the connection notification message is a Short Message Service (SMS) message which includes information regarding an attempt/failure of the transmission of the contents during the first time period and a Uniform Resource Locator (URL).

12. The system of claim 8, wherein the request for re-transmission of the contents is available only before a second time period, and individually made by each terminal.

13. The system of claim 8, further comprising: a network entity for checking whether or not any terminal unavailable for receiving the contents and informing the server about such terminals.

14. A contents transmission method of a broadcast/multicast (BCAST) service system, the method comprising:
transmitting, by a server, a contents to one or more terminals during a first time period, wherein a reception report message is fedback to the server by the terminals that have received the contents; and
determining, by the server, a re-transmission of the contents by using the feed back reception report message,
wherein the server transmits an identifier related to the first time period to the terminals, and
wherein if a contents reception success rate of the terminals is equal to or greater than a certain value, the server re-transmits the contents in a point-to-point manner, and if the contents reception success rate is smaller than the certain value, the server re-transmits the contents in a point-to-multipoint manner.

15. The method of claim 14, wherein the first time period indicates a distribution window (DW) duration, and the contents is played during a second time period indicating a presentation window (PW) duration.

16. The method of claim 14, wherein the server determines the re-transmission of the contents according to the contents reception success rate calculated by using the reception report message.

17. A contents transmission method of a broadcast/multicast (BCAST) service system, the method comprising:
transmitting, by a server, a contents to one or more terminals through a network during a first time period, wherein the network checks whether any terminals are unavailable for receiving the contents and informs the server of such terminals; and
transmitting, by the server, a connection notification message to the terminals which are unavailable for receiving the contents,
wherein the server comprises:
a contents creation unit for creating a native contents;
a BCAST service application unit for processing and protecting the created native contents or maintaining/managing a BCAST service;
a BCAST service distribution/adaptation unit for transmitting/re-transmitting the processed contents; and
a BCAST subscription management unit for maintaining/managing user subscription information and providing a list of terminals to the BCAST service distribution/adaptation unit that indicate which terminals have transmitted a reception report message and a re-transmission request message; and
wherein a re-transmission of the contents from the server is requested by the terminals using information included in the connection notification message.

18. The method of claim 17, wherein the first time period indicates a distribution window (DW) duration, and the contents is played during a second time period indicating a presentation window (PW) duration.

19. The method of claim 17, wherein the server transmits an identifier related to the first time period to the terminals.

20. The method of claim 17, wherein the connection notification message is a Short Message Service (SMS) message including information regarding an attempt/failure of the transmission of the contents during the first time period and a Uniform Resource Locator (URL).

21. The method of claim 17, wherein the request for re-transmission of the contents is available only before a second time period, and individually made.

22. A contents transmission method of a broadcast/multicast (BCAST) service system, the method comprising:
   transmitting, by a server, an identifier of each first time period to one or more terminals through a network during the first time period;
   receiving a reception report message from the terminals; and
   classifying terminals which have not transmitted the reception report message and transmitting a connection notification message thereto,
   wherein a re-transmission of the contents from the server is requested by the terminals using information included in the connection notification message,
   wherein the server determines a re-transmission of the contents according to a contents reception success rate calculated by using the reception report message, and
   wherein if the contents reception success rate is equal to or greater than a certain value, the server re-transmits the contents in a point-to-point manner, and if the contents reception success rate of the terminal is smaller than the certain value, the server re-transmits the contents in a point-to-multipoint manner.

23. The method of claim 22, wherein the first time period indicates a distribution window (DW) duration and the contents is played during a second time period indicating a presentation window (PW) duration.

24. The method of claim 22, wherein the connection notification message is a Short Message Service (SMS) message including information regarding an attempt/failure of a transmission of the contents during the first time period and a Uniform Resource Locator (URL).

25. The method of claim 22, wherein the request for re-transmission of the contents is available only before a second time period, and individually made by each terminal.

* * * * *